US010264348B1

(12) United States Patent
Harris et al.

(10) Patent No.: US 10,264,348 B1
(45) Date of Patent: Apr. 16, 2019

(54) MULTI-RESONANT COUPLED SYSTEM FOR FLAT PANEL ACTUATION

(71) Applicant: NVF Tech Ltd., Cambridgeshire (GB)

(72) Inventors: Neil John Harris, Cambridgeshire (GB); James East, Cambridgeshire (GB)

(73) Assignee: NVF Tech Ltd, Cambridgeshire (GB)

( * ) Notice: Subject to any disclaimer, the term of this patent is extended or adjusted under 35 U.S.C. 154(b) by 0 days.

(21) Appl. No.: 15/862,135

(22) Filed: Jan. 4, 2018

Related U.S. Application Data

(60) Provisional application No. 62/611,693, filed on Dec. 29, 2017.

(51) Int. Cl.
*H04R 1/24* (2006.01)
*H04R 3/12* (2006.01)
*H04S 7/00* (2006.01)
*H04R 3/08* (2006.01)
*G06F 3/01* (2006.01)
*G06F 3/16* (2006.01)
*H04R 1/02* (2006.01)
*G06F 3/0488* (2013.01)

(52) U.S. Cl.
CPC .............. *H04R 1/24* (2013.01); *G06F 3/016* (2013.01); *G06F 3/0488* (2013.01); *G06F 3/165* (2013.01); *H04R 1/028* (2013.01); *H04R 3/08* (2013.01); *H04R 3/12* (2013.01); *H04S 7/307* (2013.01)

(58) Field of Classification Search
CPC . H04R 1/24; H04R 1/028; H04R 3/08; H04R 3/12; H04R 2499/11; H04R 2440/07; H04R 2440/00; H04R 2400/03; H04R 7/04; H04R 7/045; G06F 3/016; G06F 3/0488; G06F 3/165; H04S 7/307
See application file for complete search history.

(56) References Cited

U.S. PATENT DOCUMENTS

| | | |
|---|---|---|
| 6,427,016 B1 | 7/2002 | Azima et al. |
| 6,618,487 B1 | 9/2003 | Azima et al. |
| 7,038,356 B2 | 5/2006 | Athanas |
| 7,149,318 B2 | 12/2006 | Bank et al. |
| 7,475,598 B2 | 1/2009 | Starnes et al. |
| 7,635,941 B2 | 12/2009 | Bank et al. |
| 7,684,576 B2 | 3/2010 | Bank et al. |
| 7,916,880 B2 | 3/2011 | Starnes et al. |
| 8,766,510 B2 | 7/2014 | Harris |
| 2005/0168111 A1* | 8/2005 | Bank ............ H04R 7/045 310/348 |

(Continued)

FOREIGN PATENT DOCUMENTS

| | | |
|---|---|---|
| WO | WO 1997009842 | 3/1997 |
| WO | WO2008130055 | 10/2008 |

*Primary Examiner* — Jason R Kurr
(74) *Attorney, Agent, or Firm* — Fish & Richardson P.C.

(57) ABSTRACT

A system includes a flat panel display having a panel resonant frequency response corresponding to a composition, shape, and structure of the flat panel display; and an actuator having an actuator resonant frequency response corresponding to a composition, size, and shape of the actuator; in which the actuator is mechanically-coupled to the flat panel display at a mechanical drive point, in which a coupled resonant frequency response of the system is lower than the panel resonant frequency response of the flat panel display.

19 Claims, 9 Drawing Sheets

(56) References Cited

U.S. PATENT DOCUMENTS

| | | | |
|---|---|---|---|
| 2007/0035526 A1 | 2/2007 | Takenaka et al. | |
| 2011/0123051 A1 | 5/2011 | Eaton | |
| 2016/0004311 A1* | 1/2016 | Yliaho | G06F 3/041 |
| | | | 381/99 |
| 2018/0070180 A1* | 3/2018 | Melakari | H04R 7/045 |

* cited by examiner

Asymmetric
Mode 3,2
356 Hz

Symmetric
Mode 4,2
500 Hz

Asymmetric
Mode 5,2
785 Hz

Tympanic
Mode 2,2
800 Hz

MULTI-RESONANT COUPLED SYSTEM FOR FLAT PANEL ACTUATION

CROSS-REFERENCE TO RELATED APPLICATIONS

This application claims the benefit under 35 U.S.C. § 119(e) of the filing date of U.S. Patent Application No. 62/611,693, filed on Dec. 29, 2017 and incorporated herein by reference.

BACKGROUND

Flat panel displays can be actuated to produce acoustic and/or haptic output through bending wave vibrations at frequencies near the natural resonant modal structure of the flat panel display. However, the lowest useful mode of many flat panel displays can often be too high in frequency for efficient delivery of desired low frequency feedback (e.g., low decibel levels and/or limited bandwidth), limiting low frequency response of devices that incorporate flat panel display for acoustic and/or haptic output.

SUMMARY

Technologies relating to extending the low frequency response of a flat panel display (or another bending-wave panel) are disclosed. The display can be coupled with one or more actuators (e.g., distributed mode actuators) to form a multi-resonant coupled system (e.g., a distributed mode loudspeaker (DML)) with improved performance at frequencies below the display's natural resonance. For example, a mobile device with a flat panel display having a limited range of natural frequency resonances below 500 Hz can be enhanced using a multi-resonant coupled system, whereby the low frequency bandwidth of the mobile device can be extended by the addition of one or more actuators such that the coupled system can produce resonant frequencies ranging between 300-500 Hz or 150 Hz to 300 Hz.

In general, in a first aspect, the invention features a system including a flat panel display having a panel resonant frequency response corresponding to a composition, shape, and structure of the flat panel display; and an actuator having an actuator resonant frequency response corresponding to a composition, size, and shape of the actuator; in which the actuator is mechanically-coupled to the flat panel display at a mechanical drive point, and in which a coupled resonant frequency response of the system is lower than the panel resonant frequency response of the flat panel display.

Embodiments of the system can include one or more of the following features.

The system can further include a controller programmed to provide electrical signal to drive the actuator such that the actuator produces the actuator resonant frequency response.

The mechanical drive point in the system can be selected based on a panel resonant mode of the flat panel display, the actuator having a mechanical impedance selected to match a mechanical impedance of the flat panel display at the mechanical drive point.

The actuator resonant frequency response of the actuator can be ⅔ to 1 octave below the panel resonant frequency response of the flat panel display. The actuator resonant frequency response can be at a lower frequency range with respect to a fundamental resonant frequency response of the flat panel display. The actuator can be a distributed mode actuator.

The coupled resonant frequency response can be within a range between 300-600 Hz.

The flat panel display can include a touch screen panel, a display panel, and an air gap coupled to the display panel. The system can be a component of a mobile device.

The system can include multiple actuators. For example, the actuator can be a first actuator and the mechanical drive point can be a first mechanical drive point and the system can further include a second actuator affixed to the flat panel display at a second, different mechanical drive point. The second, different mechanical drive point of the second actuator can be non-symmetrical with respect to the first mechanical drive point of the first actuator. The second actuator at the second mechanical drive point can have a second, different low frequency resonance. Each actuator affixed to the flat panel display at a respective mechanical drive point can provide a respective low frequency bandwidth and a respective level for the given low frequency bandwidth. The first respective low frequency bandwidth can correspond to a haptic response for the flat panel display and the second respective low frequency bandwidth can correspond to an acoustic response for the flat panel display.

In general, in a further aspect, the invention features a method (e.g., for extending a low frequency response of a system including a flat panel display), the method including determining, for the flat panel display, a resonant mode frequency of the flat panel display; determining, for the resonant mode frequency of the flat panel display, a mechanical drive point for the flat panel display at the resonant mode frequency; determining, for the mechanical drive point, a mechanical impedance of the flat panel display at the mechanical drive point; and selecting an actuator to mechanically couple to the flat panel display at the mechanical drive point, the selection of the actuator including: matching the mechanical impedance of the actuator to the mechanical impedance of the flat panel display at the mechanical drive point for the resonant mode frequency; tuning a frequency of the actuator such that the frequency of the actuator is at a second, different resonant frequency than the resonant mode frequency of the flat panel display.

Implementations of the method can include one or more of the following features.

The second, different resonant frequency of the actuator can be at a lower frequency with respect to the resonant mode frequency of the flat panel display. For example, the second different resonant frequency of actuator can be ⅔ to 1 octave below the resonant mode frequency of the flat panel display.

The flat panel display can include a touch screen panel, a display panel, and an air gap coupled to the display panel. The flat panel display can be a component of a mobile device.

The method can further include selecting an additional actuator to mechanically couple to the flat panel display at an additional, different mechanical drive point. The additional, different mechanical drive point of the additional actuator can be non-symmetrical with respect to the mechanical drive point of the actuator. The additional actuator at the additional mechanical drive point can have an additional, different low frequency resonance. Each actuator affixed to the flat panel display at respective mechanical drive points can provide a respective low frequency bandwidth and a respective level for the respective low frequency bandwidth. The first respective low frequency bandwidth can correspond to a haptic response for the flat panel display and the second respective low frequency bandwidth can correspond to an acoustic response for the flat panel display.

Among other advantages, coupling a first resonant system (e.g., a flat panel display with a coupled air gap) with a second resonant system (e.g., an actuator) can improve the force response and output fidelity at lower frequencies (e.g., for haptic response, audio output) of the combined multi-resonant coupled system (e.g., as a DML). Improved output can include increasing the low frequency bandwidth of the system to an acceptable (e.g., audible or perceptible) decibel level and/or increasing the efficiency of the system in its use of electrical power. The multi-resonant coupled system can be optimized in frequency bandwidth and decibel level for particular applications (e.g., acoustic, haptic applications) and use modes (e.g., receiver mode, loudspeaker mode).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
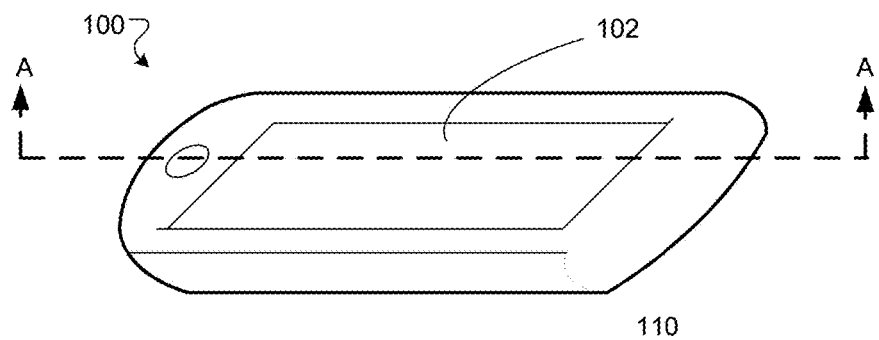
FIG. 1A is a perspective view of a mobile phone device including a multi-resonant coupled system.
Figure 1B:
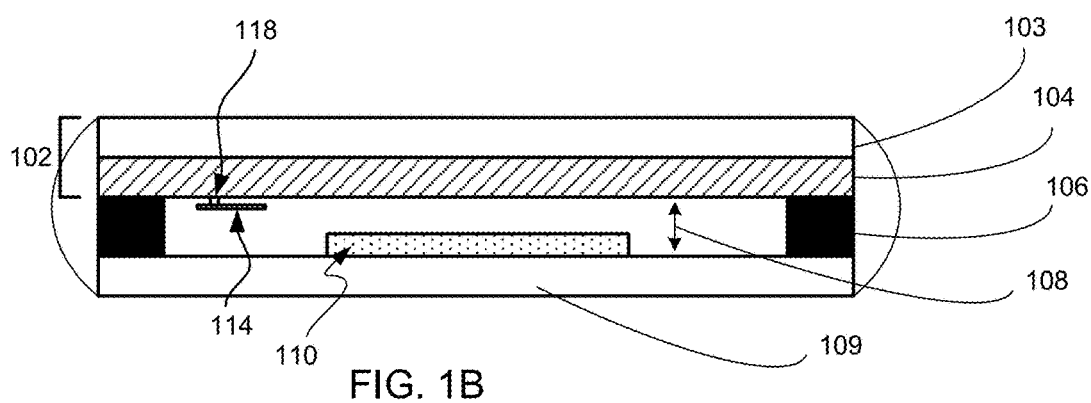
FIG. 1B is a schematic cross-section of the mobile phone device shown in FIG. 1A.
Figure 1C:
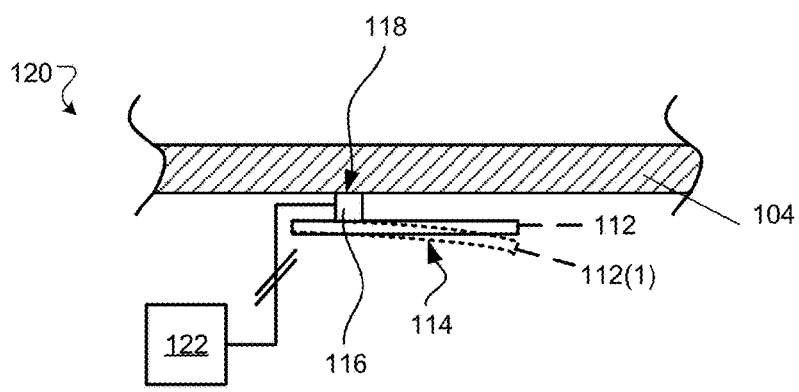
FIG. 1C is a schematic cross-section of a portion of the multi-resonant coupled system shown in FIG. 1B.

Referring to FIGS. 1A-C, a mobile phone 100 includes a multi-resonant coupled system 120 that has a flat panel display 102 coupled to an actuator 114. A cross section of phone 100 along the major axis (line A-A) shows a flat panel display 102 containing a touch screen panel 103 (e.g., a glass, plastic) and a display layer 104 (e.g., and LCD panel or an OLED panel). A suspension mechanism (e.g., mounting) 106 creates a gap 108 between display layer 104 and a back panel 109 of phone 100. System 120 includes actuator (or transducer) 114 mounted to display panel 104 at a drive point 118 using a coupler 116 (e.g., a stub).

A controller 122 applies different electrical signals (e.g., through electrical connections in coupler 116) to drive actuator 114 (e.g., a piezoelectric bimorph beam) to bend to different positions, e.g., positions 112 and 112(1) by converting electrical voltages to mechanical energy. The bending motion of actuator 114 imparts force on display panel 104, mechanically coupled to screen 103, causing bending wave vibrations in the flat panel display 102. These vibrations can couple to the air outside of flat panel display 102 to create sound (e.g., acoustics). Additionally, or alternatively, these vibrations can be used to create a haptic sensation for a user's finger in contact with flat panel display 102.

Phone 100 includes electronics 110 in gap 108. Electronics 110 can include a battery, input/output circuitry, and storage and processor electronics. Electronics 110 can include circuitry and power for controller 122.

Flat panel display 102 can be sized appropriately for a mobile phone. For example, the display can have a diagonal dimension of about 4 inches to about 7 inches. More generally, larger displays (e.g., 8 inch diagonal or more) can be used in other applications (e.g., tablet computers). Flat panel display 102 can have a thickness between about 1 mm to about 5 mm.

In general, display panel 104 can be a transmissive display panel, a reflective display panel, or an emissive display panel. Example display panels include a liquid crystal display (LCD) display panel, an organic light emitting diode (OLED) display panel. Transmissive display panels will generally include an edge light or backlight and can include additional light management components to distribute light from a light source to the display panel.

Touch screen 103 can include glass, plastic, or any other transparent material. The touch screen can also include materials for sensing touch. For example, touch screen 103 can include a transparent conductor coating for capacitive sensing (e.g., indium tin oxide (ITO)).

Space in gap 108 between back panel 109 and flat panel display 102 is generally occupied, at least in part, by electronics 110 and other phone components (e.g., a battery). The remaining space in gap 108 forms an acoustic cavity, which acts like a spring when coupled to flat panel display 102. The cavity may contain air and/or open-cell foam (e.g., a low-stiffness, open-celled elastomer). In some implementations, the acoustic cavity couples strongly with resonant modes of flat panel display 102 and can alter the way in which display 102 responds to the force from actuator 114. Thus, in some embodiments, an air gap (or foam cavity) forms part of system 120 and/or part of flat panel display 102. The coupled air gap (or foam cavity) in the display can have a thickness of 0.1 mm to 5 mm.

Although FIGS. 1A-C shows actuator 114 as a piezoelectric cantilever beam distributed mode actuator, various geometries of actuators and coupling schemes are contemplated, including centrally-coupled, simply-supported, multi-layered, and/or multi-tiered actuator geometries. Various active actuator materials are contemplated, such as piezoelectric, magnetostrictive or electret materials. The active material can be a bi-morph, a bi-morph with a central vane or substrate or a uni-morph. The active element can be fixed to a backing plate or shim which can be a thin metal sheet and can have a similar stiffness to that of the active element. Additionally, or alternatively, the actuator can be electromagnetic, such as a voice-coil motor system or a moving magnet motor system, with a dominant resonance in its force characteristic. Details about various actuator materials, geometries, and/or coupling designs are disclosed in the following applications, incorporated herein in their entirety by reference: U.S. Pat. No. 8,766,510, entitled Actuator; U.S. Pat. No. 7,916,880, entitled Transducer; U.S. Pat. No. 7,475,598, entitled Electromechanical Force Transducer; U.S. Pat. No. 7,635,941, entitled Transducer; U.S. Pat. No. 6,427,016, entitled Acoustic Devices; U.S. Pat. No. 7,684,576, entitled Resonant Element Transducer; U.S. Pat. No. 7,149,318, entitled Resonant Element Transducer; U.S. Pat. No. 6,618,487, entitled Electro-dynamic exciter.

In general, a multi-resonant coupled system may be incorporated as part of another device, for example, as part of a laptop, tablet, digital camera or video recorder, or other device that might incorporate a visual display (e.g., flat panel display 102) with audible/vibrational feedback.

In general, the multi-resonant coupled system 120 including flat panel display 102 (e.g., with or without a coupled air gap) and actuator 114 is designed to have a resonance frequency response that is different (e.g., extends to a lower frequency bandwidth) than the individual natural (or native) resonance frequency responses of the components of the multi-resonant coupled system 120. It is believed that physical objects have natural mechanical resonance modes at resonance frequencies. A resonant mode of an oscillating system is a pattern of motion in which all parts of the system move harmonically with the same frequency and with a fixed phase relation (e.g., forming a "standing wave"). A physical object, such as an actuator or a flat panel display, has a set of resonant modes, where the frequencies of these modes depend on the structure, materials, and boundary conditions of that object. When a mechanical system is driven at one of these natural resonance frequencies, the response of the mechanical system has a higher amplitude (e.g., acoustic output) than at other non-resonant frequencies. The mechanical impedance of the system (e.g., how much the system resists motion when subjected to a harmonic force) at resonance is also at a local minimum. In general, coupled resonators will have resonant frequencies that are related to, but different from, the resonant frequencies of the constituent components. Accordingly, judicious design of a coupled system can allow one to design a system having a resonance at a frequency lower than the resonant frequencies of the components.

Figure 2A:
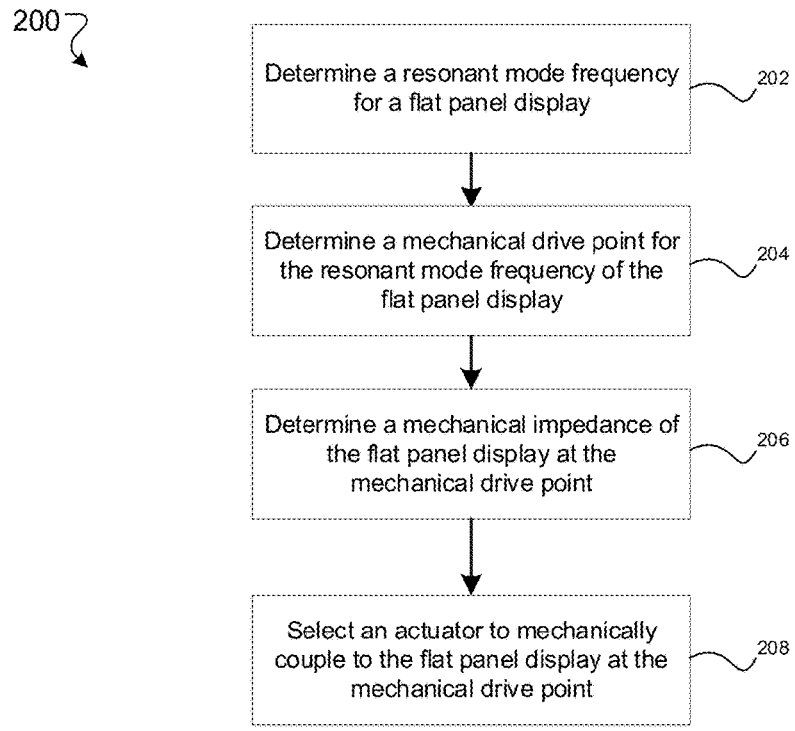
FIGS. 2A and 2B are flow diagrams of an example process for extending a low frequency response of a flat panel display using a multi-resonant coupled system.

Referring to FIG. 2A, a method 200 for designing a multi-resonant coupled system 120 that extends the low frequency response (e.g., location of resonance modes) of flat panel display 102 (e.g., with coupled air gap) is shown. Initially, the natural resonance modes of flat panel display 102 are determined in step 202. These modes can result from display 102 being driven at force sensitivities between 10 mN per volt and 50 mN per volt. Alternatively, or additionally, these modes can result from display 102 being driven at forces between 500 mN and 1 N. Based on the shape of these resonance modes, drive point 118, or location of attachment point of the actuator, is selected in step 204. The mechanical impedance of flat panel display 102 at drive point 118 is determined in step 206. Finally, an actuator design is selected for mechanical coupling to flat panel display 102 at drive point 118 in step 208.

Figure 2B:
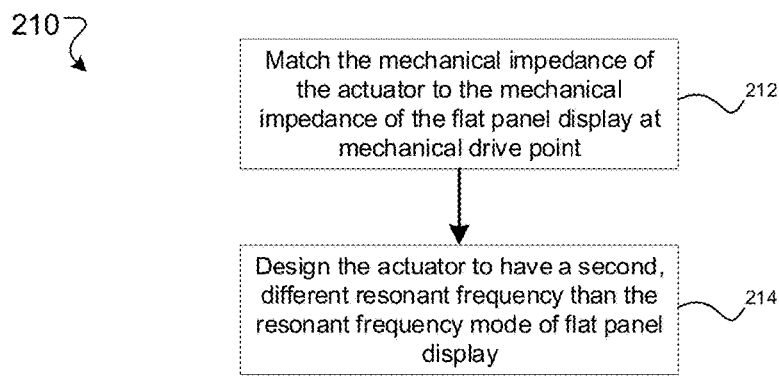

Referring to FIG. 2B, a method 210 of selecting an actuator design for step 208 id disclosed. Actuator 114 is designed in step 212 to have its mechanical impedance match the mechanical impedance of flat panel display 102 (e.g., with coupled air gap) at mechanical drive point 118. Without wishing to be bound to a particular theory, if mechanical impedances of actuator 114 and display 102 are a poor match at the drive point, the two systems do not couple well and cannot extend the frequency response of the display effectively. In step 215, actuator 114 is designed to have a second, different (e.g., lower) natural resonant frequency than the resonant frequency mode of flat panel display 102. The selected actuator can extend the low frequency response (e.g., location of resonance modes) of flat panel display 102.

Without wishing to be bound by any particular theory, the physics behind the selection and design methods in FIGS. 2A-2B will be explained in further detail below based on a specific finite element model of a smart phone 100 with a flat panel display 102.

In general, in some implementations, finite element modeling (or hypothetical lumped parameter mathematical modeling) of a multi-resonant coupled system (e.g., flat panel display including an actuator) can be performed to determine one or more parameters of the multi-resonant coupled system. The one or more parameters may include mechanical drive point location, resonant frequency mode of a flat panel display included in the multi-resonant coupled system, actuator mechanical impedance, and actuator resonant frequency. In some implementations, the model may receive as input properties of the flat panel display (e.g., material, dimensions), mechanical ground connection, cavity (e.g., air or low-stiffness, open-celled foamed elastomer). The model may additionally receive as input information related to added mass and localized stiffening of the flat panel display due to the mechanical coupling of one or more actuators, which may change the resonance frequencies of the flat panel display. Additional inputs can include design constraints imposed by placement of other parts of the device (e.g., such as placement of other electronics 110 in phone 100), desired output (e.g., acoustics, haptics), and use mode (e.g., loudspeaker, receiver).

In the model used for FIGS. 3-4, 6, and 8, the touchscreen panel 103 was made from aluminosilicate glass of 165×65×0.55 mm. An OLED display panel 104 of diagonal dimension 158.8 mm (6.25 in) was bonded onto the back of the touchscreen panel. The flat panel display was connected to a mechanical ground (e.g., back panel 109) via a thin elastomeric adhesive tape 106. A cavity 108, including a small air gap of 0.5 mm behind the display and other internal air spaces, was included in the model.

Figure 3:
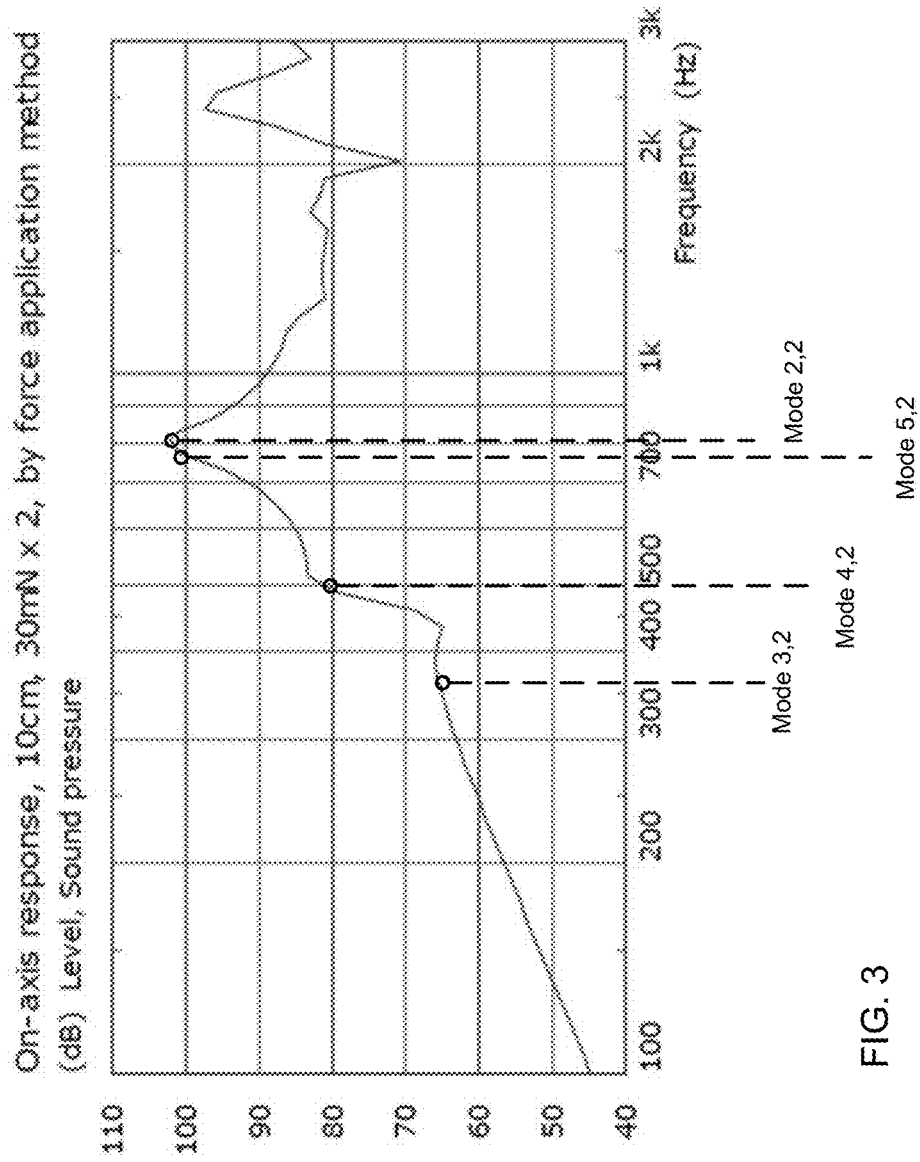
FIG. 3 is a plot of the natural resonance response of a flat panel display for a range of frequencies.
Figure 4A:
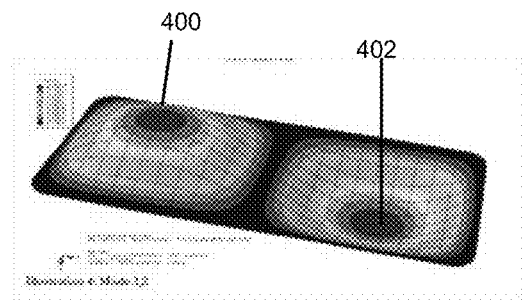
FIGS. 4A-4D are three-dimensional surface plots of natural resonance modes of a flat panel display at specified frequencies.
Figure 4B:
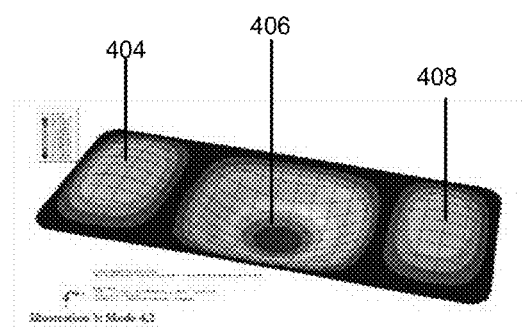
Figure 4C:
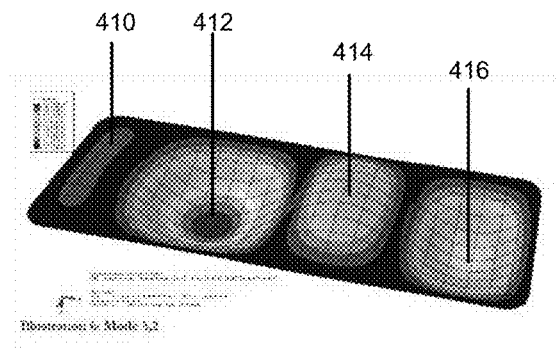
Figure 4D:
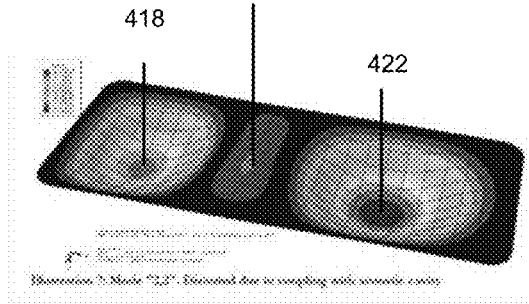

FIG. 3 shows a plot of the natural resonance modes of flat panel display 102 when driven by a force of 30 mN at two points along the major axis of display 102 (line A-A in FIG. 1A) at a range of frequencies. Specifically, the plot shows the response of display 102 in terms of sound pressure produced by the display for different applied frequencies, the response modeled as being measured 10 cm away from the source of the force. As shown on the plot, there are resonance modes at the following frequencies: 356 Hz, 500 Hz, 785 Hz, and 800 Hz. FIGS. 4A-4D show contour maps of flat panel display 102 in these various modes, where the contours indicate amplitude of the resonant frequency response over an area of the flat panel display 102. Referring to FIG. 4A, an asymmetric mode 3,2 at 356 Hz has two poles (or antinodes) 400 and 402 of opposite polarity at the two ends of the panel. Referring to FIG. 4B, a symmetric mode 4,2 at 500 Hz has three poles 404, 406, and 408. The two poles at the ends, 404 and 408, have the same polarity and amplitude. The middle pole 406 has the opposite polarity and twice the amplitude of the side poles. Referring to FIG. 4C, an asymmetric mode 5,2 at 785 Hz has four poles 410, 412, 414, 416 of alternating polarities. The amplitude of pole 412 is the biggest, followed by pole 416, 414, and 410 with the smallest amplitude. Referring to FIG. 4D, a tympanic mode 2,2 at 800 Hz is distorted due to coupling with acoustic cavity 108. The mode has 3 poles of alternating polarity, 418, 420, and 422. The two poles at the edges of the display, 418 and 422, have significantly larger amplitudes than the pole 420 in the middle.

Certain shapes of resonant modes for flat panel display 102 can be more useful for different acoustic/haptics applications than others. For example, mode 4,2 in FIG. 4B can be more useful for acoustic radiation and for haptic feedback near the center of the panel than the other modes shown in FIGS. 4A, 4C, 4D, because of mode 4,2's central pole 406. In other words, modes, such as 4,2, can be used in loudspeaker mode—e.g., when the display is being used to show visual content and is positioned in front of the user. Some of the modes, such as mode 3,2, can be more useful when phone 100 is being used as a receiver—e.g., when a user's ear is positioned near one of the two poles to receive a call.

Without wishing to be bound by any particular theory, attaching actuator 114 to flat panel display 102 at specific locations on the display (e.g., drive points 118), can enhance the low frequency response of the phone (e.g., to 300 Hz or 350 Hz) below its lowest natural resonant frequency useful for acoustic and haptic output (e.g., 500 Hz). For example, with flat panel displays of smartphones, a shallow acoustic cavity (e.g., in gap 108) or layer of open-cell foam couples strongly with the modes of flat panel display 102, as modeled above. This coupling (as shown in FIGS. 4A-4B) can alter the sequence of natural mode shapes of the display, and increase the resonance frequency of the first symmetrical mode useful for audio output (e.g., mode 4,2 at 500 Hz for the modeled example in FIG. 4B). This effect can result in reduced acoustic/haptics response of panel 102 at lower audible/haptics frequencies.

Actuator 114 designed to have a specific impedance and resonance frequency can be coupled to flat panel display 102 at a selected drive point 118 to achieve an improved acoustic/haptic output at frequencies below 500 Hz (e.g., 300-350 Hz). As described above, finite element modeling was used to determine how the addition of actuator 114 to flat panel display 102 at a selected drive point 118 can be used to expand the frequency response of panel 102 to lower frequencies. For example, the addition of actuator 114 can increase the response of the multi-resonant coupled system 120 at the panel's native resonance (e.g., at 500 Hz for model 4,2) and possibly provide additional modes (e.g., from rotational forces on actuator 114). The multi-resonant coupled system can increase the response of flat panel display 102 at a native resonance peak by 1 to 5 decibels. The increase in response may depend on the damping of the natural modes of display 102, e.g., due to coupling with an air gap. Additionally, or alternatively, the multi-resonant coupled system can create an additional mode that provides 1 decibel to 5 decibels, or up to 10 dB, or up to 20 dB, of increased response at a new resonant frequency that is below the resonant frequencies of the natural modes of flat panel display 102. Without wishing to be bound by any particular theory, creating additional modes slightly above the lower natural modes of display 102 can also increase the response of the system (e.g., make the output louder at those frequencies) and potentially smoothen it.

The choice of actuator 114 and drive point 118 depends on the desired frequency output of the multi-resonant coupled system 120. For example, for acoustic output (e.g., in use in loudspeaker mode), the low frequency performance is preferably relatively continuous between 300 Hz to 600 Hz. In other words, there are no significant gaps in the frequency response at low frequencies (e.g., around 300 Hz). In such a case, the finite element model (with inputs as described above) showed that coupling an actuator 114 with resonance at about ⅔ to 1 octave below (63% to 50% of) the relevant panel 120 resonance frequency (e.g., symmetric 4,2 mode for acoustic output) produced improved, relatively continuous low frequency response around 300 Hz up to 600 Hz.

Figure 5A:
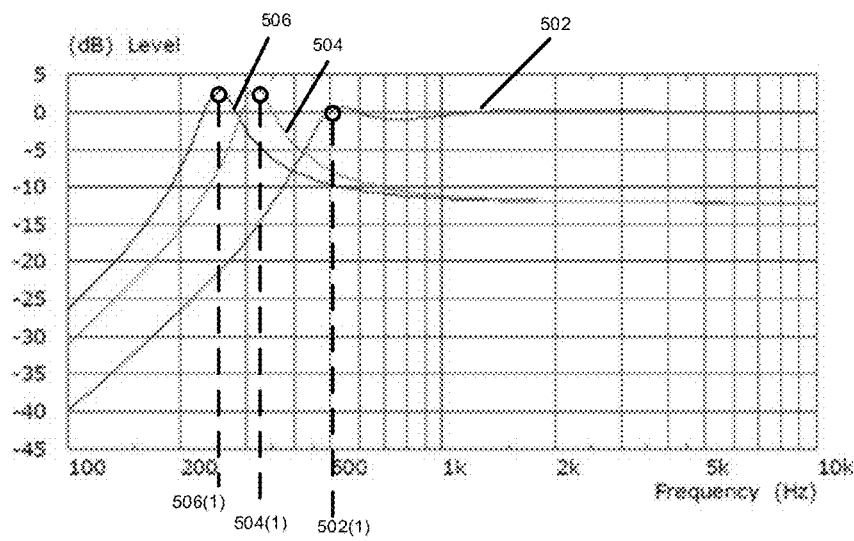
FIG. 5A is a plot of frequency versus decibel level for various components of an example multi-resonant coupled system.
Figure 5B:
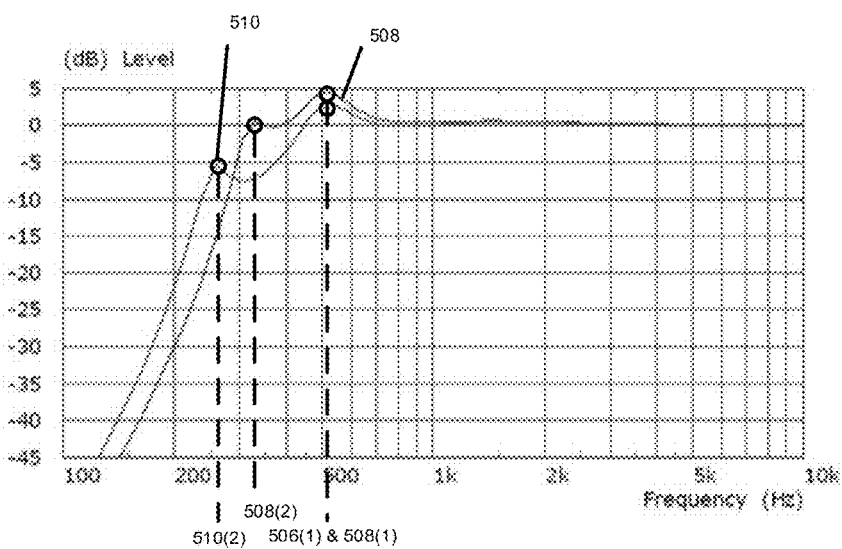
FIG. 5B-5C are plots of frequency versus decibel level for various multi-resonant coupled systems.
Figure 5C:
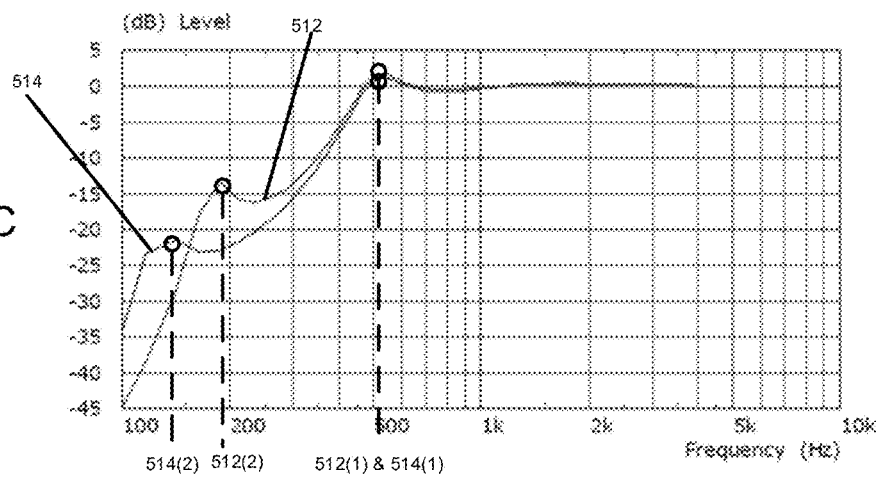

FIGS. 5A-5C show lumped parameter mathematical modeling results of how the difference between the native resonance frequency of a hypothetical actuator 114 and display panel 102 can change the response of multi-resonant coupled system 120. Referring to FIG. 5A, the native response in decibels to a hypothetical driving force for a range of frequencies is plotted for: a flat panel display (plot 502) with a symmetric 4,2 resonance peak 502(1) at 500 Hz; an actuator (plot 504; "⅔ octave actuator") that has a resonance frequency 504(1) at ⅔ of an octave below peak 502(1); and a second actuator (plot 506; "1 octave actuator") that has a resonance frequency 506(1) at 1 octave below peak 502(1).

Referring to FIG. 5B, the response in decibels to the same hypothetical driving force as in FIG. 5A for a range of frequencies is plotted for: a multi resonant coupled system (plot 508) that combines flat panel display (in plot 502) and the ⅔ octave actuator (in plot 504); and a multi resonant coupled system (plot 510) that combines flat panel display (in plot 502) and the 1 octave actuator (in plot 506). The system with the ⅔ octave actuator in plot 508 has an increased output 508(1) at the 500 Hz natural resonance peak of the display panel, and an additional peak 508(2) near 300 Hz. The system with the 1 octave actuator in plot 510 has an increased output 510(1) at the 500 Hz natural resonance peak of the display panel, and an additional peak 510(2) near 250 Hz. FIG. 5B thus shows that an actuator with a natural resonance frequency of ⅔ to 1 octave below the natural resonance frequency of the flat panel display 4,2 mode peak can provide an increased system response when coupled to the display at frequencies around 250-500 Hz. Such a relatively continuous response can be beneficial for an acoustic loudspeaker use mode of phone 100.

For haptics output (e.g., below 300 Hz), the response at low frequencies of multi-resonant system 120 can be discontinuous with the response at higher frequencies (e.g., at 500 Hz). Sufficient response at haptics frequencies can be achieved by coupling flat panel display 102 with actuators that have a resonance frequency difference from the 4,2 mode of the flat panel display of more than 3/2 or 2 octaves.

Referring to FIG. 5C, the response in decibels to the same a hypothetical driving force as in FIGS. 5A-5B for a range of frequencies is plotted for: a multi resonant coupled system (plot 512) that combines flat panel display (in plot 502) and an actuator ("3/2 octave actuator") with a resonance peak 3/2 octaves below the panel's 4,2 mode; and a multi resonant coupled system (plot 514) that combines flat panel display (in plot 502) and an actuator ("2 octave actuator") with a resonance peak 2 octaves below the panel's 4,2 mode. The system with the 3/2 octave actuator in plot 512 has an increased output 512(1) at the 500 Hz natural resonance peak of the display panel, and an additional peak 512(2) near 200 Hz. The system with the 2 octave actuator in plot 514 has an increased output 514(1) at the 500 Hz natural resonance peak of the display panel, and an additional peak 514(2) near 150 Hz. FIG. 5C thus shows that an actuator with a natural resonance frequency of 3/2 to 2 octaves below the natural resonance frequency of the flat panel display 4,2 mode peak can provide an increased system response when coupled to the display at frequencies around 150-200 Hz. The improvement is low frequency response is less uniform or continuous, but the extra output at peaks 512(2) and 514(2) are useful for haptics output. These peaks can also be useful for close-coupled acoustics of "receiver mode" where the user puts their ear to one side of the display to receive a phone call. Without wishing to be bound by any particular theory, "receiver mode" can tolerate less continuity in response because receiver mode can be quieter e.g., than loudspeaker mode, therefore there can be more headroom available for equalisation of the frequency response.

The resonance frequency of actuator 114 can be selected to produce the desired output for the acoustic/haptics applications discussed above (as shown in FIGS. 5B-5C). The natural resonance of the actuator depends on the actuator geometry and attachment mechanism to flat panel display 102. The material, length, shape, and mass of the actuator, for example, can be modified to achieve the resonance response required by the application. A variety of different actuator materials and geometries are contemplated, as discussed above. For example, for a piezoelectric beam actuator, an estimate of the resonance frequency may be made using well-known formulas for cantilever beam modes. Finite element modelling can be used to get a more accurate value. For simpler types of actuators, a simple mass-spring system may exist, from which the resonance frequency can be calculated.

Without wishing to be bound by any particular theory, aside from selecting the proper resonance frequency for actuator 114, how the actuator is coupled to the flat panel display 102 can also be controlled to produce the application-dependent results shown in FIGS. 5B-5C. As detailed below, proper coupling includes attaching actuator 114 to flat panel display 102 at a specific driving point 118 and selecting a mechanical impedance for the actuator that matches that of flat panel display 102 at driving point 118 at the frequency range selected for enhancement (e.g., 300 to 600 Hz).

Mechanical drive point 118 can be selected to mechanically-couple actuator 114 to flat panel display 102 based on design constraints of phone 100 and the shape of the resonance modes (e.g., as shown in FIGS. 4A-4D) of display 102. Design constraints of the phone that can limit the drive point 118 locations include the position of other elements in gap 108 of phone 100, such as electronics 110 (e.g., battery, circuit boards, wiring etc.). For example, if electronics 110 are centrally located under flat panel display 102, then drive point 118 has to be selected closer to the edges of the display.

Additionally, or alternatively, drive point 118 can be selected based on locations of one or more poles (e.g., 404, 408) for a particular resonant mode (e.g., 4,2 resonant mode) of the flat panel display 102. Without wishing to be bound by a particular theory, the drive point 118 determines which modes are achievable for multi-resonant coupled system 120. For example, coupling the drive point to the location of a natural resonance mode pole of flat panel display 102 can result in enhancement of that mode in the combined actuator/display system (e.g., as shown at peak 508(1) in FIG. 5B or peak 820(2) in FIG. 8).

In some embodiments, the drive point is located along the major axis of display 102 (e.g., along line A-A in FIG. 1A), away from the edge by 5% to 10% of the length of the display, or up to 30%, or up to 50%.

In some implementations, the intended output frequency range (e.g., low frequency acoustic radiation or haptic feedback) can also determine an appropriate mechanical drive point 118 for actuator 114 on the flat panel display 102. For example, for acoustic radiation output in loudspeaker mode, a mechanical drive point 118 may be selected to be at a center pole of a panel resonant mode (e.g., 406, 420) of flat panel display 102. Without wishing to be bound by any particular theory, efficient loudspeaker mode acoustic output benefits from some net displacement of the panel, and driving display 102 near the center generally favours such output (e.g., modes shown in FIGS. 4B and 4D). For haptic feedback response (e.g., response at frequencies below 300 Hz) or receiver mode, a mechanical drive point 118 can be selected at a side pole (e.g., antinode 400 or 402) near an edge of flat panel display 102 (e.g., mode shown in FIG. 4A). Without wishing to be bound by any particular theory, positioning the drive point at a side pole can provide favorable output at lower frequencies for haptics (e.g., mode 3,2 is the lowest frequency resonance mode for display 102) and/or sufficient output for receiver mode (e.g., at near field acoustics).

Actuator 114 can be selected to have a mechanical impedance that approximately matches that of flat panel display 102 (coupled to gap 108) at driving point 118 at the frequency range selected for enhancement (e.g., 300 to 600 Hz). Mechanical impedance determines how much a physical system resists motion when subjected to a harmonic force (e.g., at a specific frequency). For example, the impedance of display 102 depends on the material and dimensions of display 102, the suspension mechanism 106 of phone 100, and the air gap (part of gap 108) coupled to the flat panel display 102. Different displays and actuators produce different maximum velocities for a common specified force depending on their impedance. Without wishing to be bound to a particular theory, if mechanical impedances of actuator 114 and display 102 (or display 102 coupled to an air gap, as in the model described above) do not match at the drive point (at the driving frequency), the two systems do not couple (e.g., they oscillate independently) and cannot extend the frequency response of the display.

In addition, selecting actuator impedance is important for output efficiency. The velocity of display 102 (e.g., output) is determined jointly by the actuator force and by the actuator 114 and display 102 impedances. For example, with solid-state piezoelectric actuators, high actuator force can come with high source (actuator) impedance (e.g., force and impedance are proportional), so selecting the right actuator can be important. Too much force might not produce useful extra acoustic output due to high impedance, while costing more energy. Too little force could result in a reduction in performance.

Figure 6:
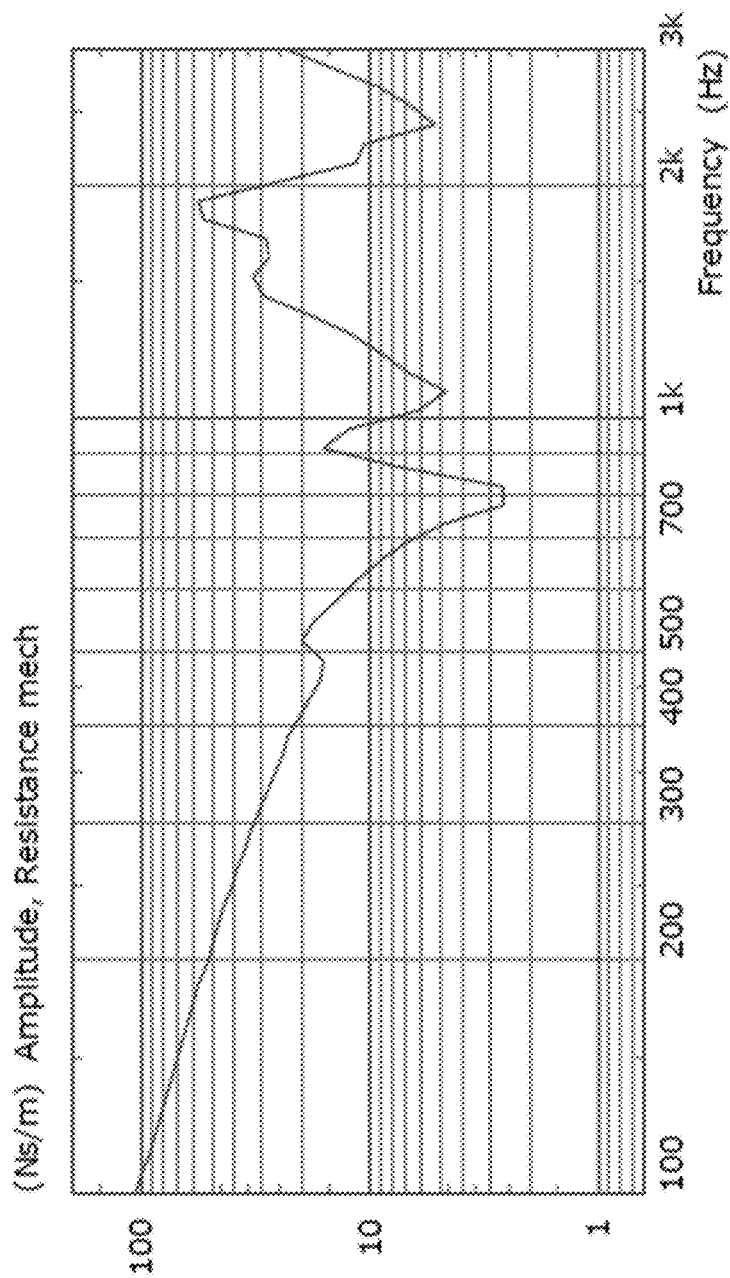
FIG. 6 is a logarithmic plot of the mechanical impedance of a flat panel display for a range of frequencies.

FIG. 6 shows a plot of the impedance (in Ns/m) of flat panel display 102 (coupled to an air gap and with properties described above) when driven by a force of 30 mN along the major axis of display 102 (line A-A in FIG. 1A) at a range of frequencies. The impedance reaches a minimum at the frequency of the tympanic (2, 2) mode at 800 Hz. Below this frequency, the impedance is essentially that of a spring, being roughly inversely proportional to frequency. FIG. 6 shows that the response, along the major axis, of flat panel display 120 at frequencies around 300 Hz is low (as seen in FIG. 3) because the impedance of the display at those frequencies is high. In some embodiments, the target impedance of actuator 114 is designed to approximately match the low-frequency cut-off for the coupled system 120 (e.g., about 30 Ns/m at 300 Hz). The targeted cut-off frequency depends on the desired application to be enhanced (e.g., acoustics/haptics, loudspeaker/receiver) as described above. In some embodiments, the impedance of actuator 114 can range between 10 Ns/m and 50 Ns/m, or even 100 Ns/m. The actuator impedance can vary between 50% and 200% of the target impedance of display 102 at a selected frequency and drive point.

The mechanical impedance of actuator 114 may be tuned, for example, by changing one or more of the physical properties of the actuator. The impedance of actuator 114 depends on the actuator geometry. For example, the material, length, shape, and mass of the actuator can be modified to achieve impedance matching. A variety of different actuator materials and geometries are contemplated, as discussed above.

Figure 7A:
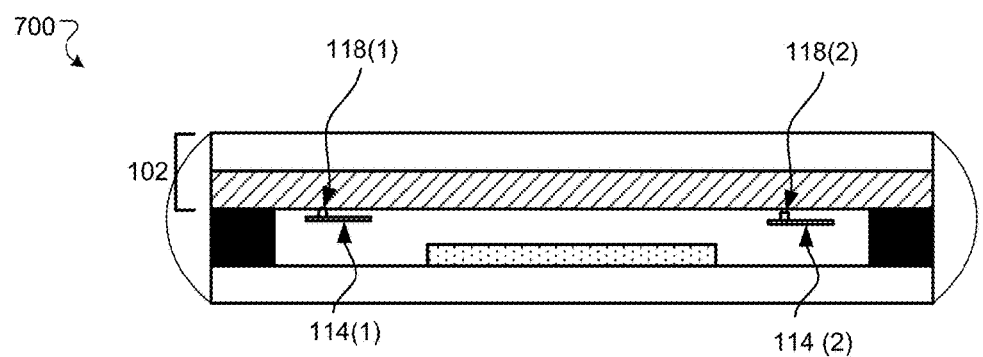
FIGS. 7A-7B are schematic cross-sections of other example multi-resonant coupled systems.
Figure 7B:
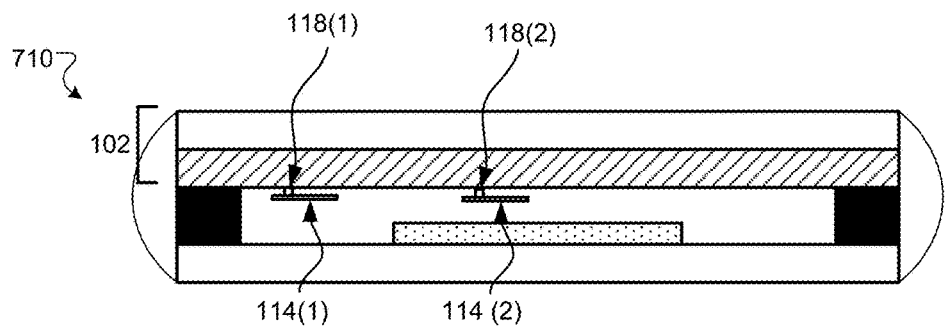

In some implementations, two or more actuators can be included in a multi-resonant coupled system. A multi-resonant coupled system including two or more actuators mechanically coupled to a flat panel display may further enhance a low frequency bandwidth response of the multi-resonant coupled system. FIGS. 7A-7B are schematic views of such multi-actuator multi-resonant coupled systems.

Referring to FIG. 7A, a multi-resonant coupled system 700 includes two actuators 114(1) and 114(2) each mechanically coupled to flat panel display 120 at respective drive points 118(1) and 118(2) positioned at symmetric locations (e.g., approximately equidistant in opposite directions from the center of flat panel display 120) along the major axis of flat panel display 120 (along line A-A in FIG. 1A). The addition of a second actuator at another symmetric resonant frequency response peak can further enhance an acoustic output (e.g., increase decibel level achievable) at lower frequencies for multi-resonant coupled system 700. In some embodiments, the drive points are 5% to 10%, or up to 20%, or up to 30% of the length of the flat panel display 102 away from the respective edges of the display along the major axis.

Figure 8:
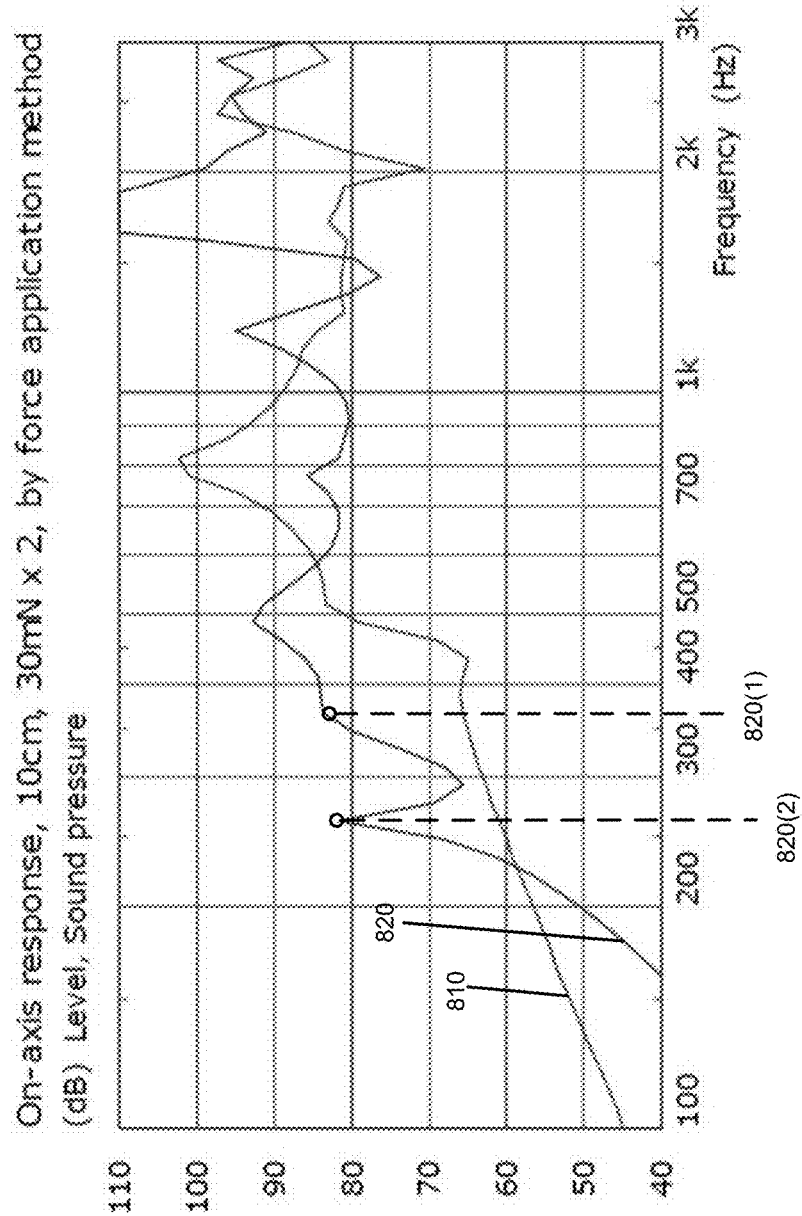
FIG. 8 is a plot comparing the natural resonance response of a flat panel display to the response of a multi-resonant coupled system for a range of frequencies.

FIG. 8 shows, based on the finite element model described above, a curve 810 of the natural resonance modes of flat panel display 102 when driven by a force of 30 mN along the major axis of display 102 (line A-A in FIG. 1A) at a range of frequencies (as in FIG. 3) compared to a curve 820 of the resonance modes of coupled system 700 driven by the same force at drive points 118(1) and 118(2). Without wishing to be bound by any particular theory, FIG. 8 shows that the added mass and localized stiffening of flat panel display 102 due to the attachment of actuators 114(1) and 114(2) changed the resonance frequencies of system 700. The coupled system 700 changed the symmetry of the display panel 102 (plus coupled air gap) so that the asymmetric (3,2) mode started to give some acoustic output at 300 Hz, as shown at peak 820 (1). In addition, the moment (e.g., torque in addition to a normal force) generated by the swinging cantilever actuators 114(1) and 114(2) provided useful extra low-frequency force. An additional new coupled mode at 250 Hz, peak 820(2), is also generated.

In some embodiments, additional actuators can be placed at asymmetrical positions along the flat panel display's major axis. Referring to FIG. 7B a multi-resonant coupled system 710 includes two actuators 114(1) and 114(2) each mechanically coupled to flat panel display 120 at respective drive points 118(1) and 118(2) positioned at asymmetric locations (e.g., not equidistant from the center of flat panel display 120) along the major axis of flat panel display 120 (along line A-A in FIG. 1A). In some embodiments, the drive point 118(1) is 5% to 10%, or up to 20%, or up to 30% of the length of the flat panel display 102 away from one of the edges of the display along the major axis. In some embodiments, the drive point 118(2) is 20% to 40%, or up to 50%, or up to 70% of the length of the flat panel display 102 away from same the edge of the display along the major axis.

Without wishing to be bound by any particular theory, asymmetric of placement of actuators allows the actuators to provide different mode enhancements, with one actuator potentially filling in the enhancement gap resulting from the other. For example, one actuator can enhance resonance modes for acoustic output (300-600 Hz) and the other actuator can enhance haptics output (below 300 Hz). Alternatively, or additionally, both actuators can enhance acoustic output, but for different use modes. For example, one of the actuators can enhance a broader range of low frequency bandwidths at a lower response level for receiver mode, while the other actuator can enhance a narrower low frequency bandwidth at a higher response level for loudspeaker mode.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Figure 9:
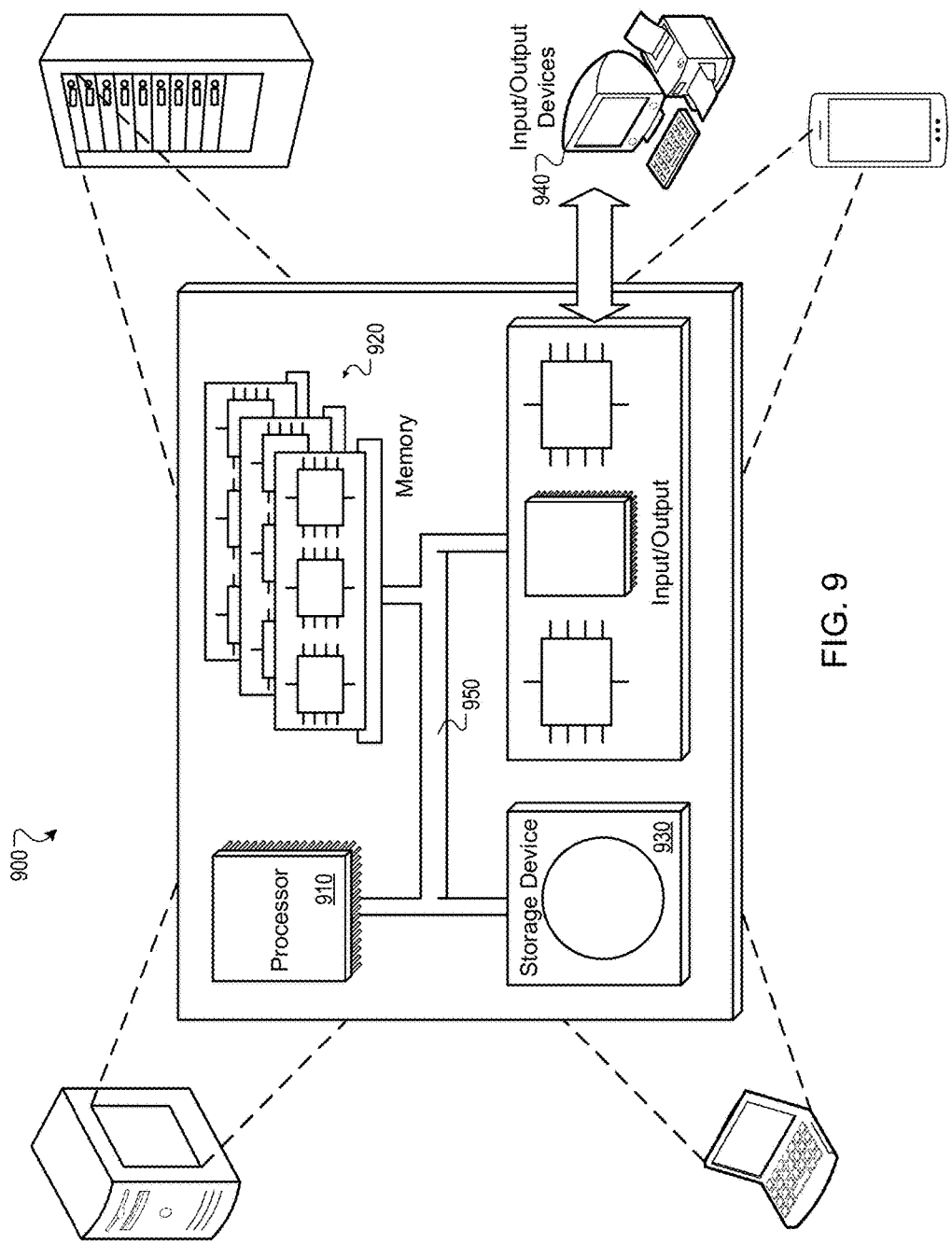
FIG. 9 is a schematic diagram of an example computer system that can be part of or used in conjunction with the devices described above.

FIG. 9 is a schematic diagram of an example computer system 900. The system 900 can be used to carry out the operations described in association the implementations described previously (e.g., those of controller 92). In some implementations, computing systems and devices and the functional operations described above can be implemented in digital electronic circuitry, in tangibly-embodied computer software or firmware, in computer hardware, including the structures disclosed in this specification (e.g., system 900) and their structural equivalents, or in combinations of one or more of them. The system 900 is intended to include various forms of digital computers, such as laptops, desktops, workstations, personal digital assistants, servers, blade servers, mainframes, and other appropriate computers, including vehicles installed on base units or pod units of modular vehicles. The system 900 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system having a coupled resonant frequency response comprising a plurality of resonant frequencies, the system comprising:
a bending-wave panel having a panel resonant frequency response corresponding to a composition, shape, and structure of the bending-wave panel, the panel resonant frequency response comprising a plurality of resonant frequencies including a lowest resonant frequency useful for acoustic output; and
an actuator having an actuator resonant frequency response corresponding to a composition, size, and shape of the actuator, the actuator resonant frequency response comprising an actuator resonant frequency at about ⅔ to one octave below the lowest resonant frequency of the bending-wave panel useful for acoustic output;
wherein the actuator is mechanically-coupled to the bending-wave panel at a mechanical drive point, and wherein a resonant frequency of the coupled resonant frequency response of the system in a range from 300 Hz to 600 Hz is lower than the lowest resonant frequency useful for acoustic output of the bending-wave panel.

2. The system of claim 1, further comprising a controller programmed to provide an electrical signal to drive the actuator such that the actuator produces the actuator resonant frequency response.

3. The system of claim 1, wherein the mechanical drive point is selected based on a panel resonant mode of the bending-wave panel, the actuator having a mechanical impedance selected to match a mechanical impedance of the bending-wave panel at the mechanical drive point.

4. The system of claim 3, wherein the actuator is a first actuator and the mechanical drive point is a first mechanical drive point and wherein the system further comprises a second actuator affixed to the bending-wave panel at a second, different mechanical drive point.

5. The system of claim 4, wherein the second, different mechanical drive point of the second actuator is non-symmetrical with respect to the first mechanical drive point of the first actuator, and wherein the second actuator at the second mechanical drive point has a second, different low frequency resonance.

6. The system of claim 5, wherein each actuator affixed to the bending-wave panel at a respective mechanical drive point provides a respective low frequency bandwidth and a respective level for the given low frequency bandwidth.

7. The system of claim 6, wherein the first respective low frequency bandwidth corresponds to a haptic response for the bending-wave panel and the second respective low frequency bandwidth corresponds to an acoustic response for the bending-wave panel.

8. The system of claim 1, wherein the bending-wave panel comprises a touch screen panel, a display panel, and an air gap coupled to the display panel.

9. The system of claim 1, wherein the system is a component of a mobile device.

10. The system of claim 1, wherein the actuator is a distributed mode actuator.

11. The system of claim 1, wherein the bending-wave panel comprises a flat panel display.

12. A method comprising:
determining, for a bending-wave panel, a lowest resonant mode frequency of the bending-wave panel suitable for acoustic output;
determining, for the lowest resonant mode frequency of the bending-wave panel suitable for acoustic output, a mechanical drive point for the bending-wave panel at the lowest resonant mode frequency;
determining, for the mechanical drive point, a mechanical impedance of the bending-wave panel at the mechanical drive point; and
selecting an actuator to mechanically couple to the bending-wave panel at the mechanical drive point, the selection of the actuator comprising:
matching the mechanical impedance of the actuator to the mechanical impedance of the bending-wave panel at the mechanical drive point for the resonant mode frequency;
tuning a frequency of the actuator such that the frequency of the actuator is at a second, different resonant frequency than the resonant mode frequency of the bending-wave panel at about ⅔ to one octave below the lowest resonant frequency of the bending-wave panel suitable for acoustic output,
wherein a coupled system comprising the bending-wave panel and the actuator attached to the mechanical drive point has a resonant frequency in a range from 300 Hz to 600 Hz that is lower than the lowest resonant mode frequency of the bending-wave panel suitable for acoustic output.

13. The method of claim 12, wherein the bending-wave panel comprises a touch screen panel, a display panel, and an air gap coupled to the display panel.

14. The method of claim 12, wherein the bending-wave panel is a component of a mobile device.

15. The method of claim 12, further comprising selecting an additional actuator to mechanically couple to the bending-wave panel at an additional, different mechanical drive point.

16. The method of claim 15, wherein the additional, different mechanical drive point of the additional actuator is non-symmetrical with respect to the mechanical drive point of the actuator, and wherein the additional actuator at the additional mechanical drive point has an additional, different low frequency resonance.

17. The method of claim 16, wherein each actuator affixed to the bending-wave panel at respective mechanical drive points provides a respective low frequency bandwidth and a respective level for the respective low frequency bandwidth.

18. The method of claim 17, wherein the first respective low frequency bandwidth corresponds to a haptic response for the bending-wave panel and the second respective low frequency bandwidth corresponds to an acoustic response for the bending-wave panel.

19. The method of claim 12, wherein the bending-wave panel comprises a flat panel display.

* * * * *